United States Patent [19]
Okuda et al.

[11] Patent Number: 5,832,092
[45] Date of Patent: Nov. 3, 1998

[54] COMMUNICATION SYSTEM BASED ON SHARED CIPHER KEY, SERVER UNIT FOR THE SAME SYSTEM, CLIENT UNIT FOR THE SAME SYSTEM, AND METHOD OF SHARING CIPHER KEY IN COMMUNICATION SYSTEM

[75] Inventors: Masataka Okuda, Tokyo-to; Hideaki Ishioka, Ichikawa, both of Japan

[73] Assignee: Trans Cosmos, Inc., Tokyo, Japan

[21] Appl. No.: 736,621

[22] Filed: Oct. 24, 1996

[30] Foreign Application Priority Data

May 27, 1996 [JP] Japan .................................. 8-154991

[51] Int. Cl.⁶ ....................................................... H04L 9/00
[52] U.S. Cl. ............................................................. 380/49
[58] Field of Search ................................... 380/25, 48, 49

[56] References Cited

U.S. PATENT DOCUMENTS

| | | | |
|---|---|---|---|
| 4,484,025 | 11/1984 | Ostermann et al. ....................... | 380/49 |
| 5,469,507 | 11/1995 | Canetti et al. ............................ | 380/25 |
| 5,535,176 | 7/1996 | Ganesan et al. .......................... | 380/49 |
| 5,600,722 | 2/1997 | Yamaguchi et al. ...................... | 380/49 |
| 5,604,807 | 2/1997 | Yamaguchi et al. ...................... | 380/48 |
| 5,689,566 | 11/1997 | Nguyen .................................... | 380/49 |
| 5,761,309 | 6/1998 | Ohasi et al. .............................. | 380/25 |

*Primary Examiner*—Salvatore Cangialosi
*Attorney, Agent, or Firm*—McDermott, Will & Emery

[57] ABSTRACT

A communication system which is capable of proper cipher communications with many and unspecific parties and of making all the entities share a common key and which does not require the change of its own secret information even if the public information is altered for the security purposes. In the communication system, a shared cipher key is changeable with only the change of a control variable of a server without the change of code figures of clients. Accordingly, the system operation to change the shared cipher key is possible at a short-time internal, which significantly improve the security of the cipher system. In addition, with the server control variable being set to a specific value, a client group belonging to a server can share the same cipher key. Thus, an in-group cipher is decipherable with only the server control in particular situations such as urgent situations.

9 Claims, 6 Drawing Sheets

METHOD OF INDIVIDUALLY SHARING CIPHER KEY

METHOD OF REGISTERING PUBLIC INFORMATION WITH PUBLIC FILE

METHOD OF PREVIOUSLY DISTRIBUTING ALGORITHM THROUGH CENTER

COMMUNICATION SYSTEM BASED ON SHARED CIPHER KEY, SERVER UNIT FOR THE SAME SYSTEM, CLIENT UNIT FOR THE SAME SYSTEM, AND METHOD OF SHARING CIPHER KEY IN COMMUNICATION SYSTEM

BACKGROUND OF THE INVENTION

1. Field of the Invention

The present invention relates to a cryptology communication system, and more particularly to improvement of a cipher key sharing method for an encryption of a communication statement and a decryption or decipher of the encrypted statement in wire or wireless computer networks, mobile communication systems or the like.

2. Description of the Prior Art

Recently, there have hitherto been known a variety of methods of sharing a cipher key, as exemplified in FIGS. 7 to 9, the summaries of which are as follows.

(1) Method of Individually Sharing Cipher Key

As shown in FIG. 7, each of entities is made to share a cipher key with all the possible or expected other parties. In this instance, each client is required to retain shared keys corresponding in number to the other parties.

However, the large number of the other parties results in extremely troublesome management, and hence this method is not suitable for the cryptology communications with many and unspecific parties.

(2) Method of Registering Public Information with Public File

According to this method, each entity makes up open information on the basis of his own secret or private information and registers it with a public file which allows it to be read out but strictly controls it in writing and erasing. In this case, at the communication the cipher key to be shared is found from a calculation as a function of his own secret information and the other party's public information. For example, referring to FIG. 8 the calculation is made in accordance with an algorithm of b'a=a'b where a represents the secret information of a client A, a'designates the public information of the same client A, b signifies the secret information of another client B, and b'denotes the public information of the same client B.

However, this method does not permit all the entities to get a common key, and in addition, in the case of changing the public information for the purpose of security, the change in his own secret information is also necessary, which makes difficult its management.

(3) Method of Previously Distributing Secret Algorithm through Center

According to this method, a center draws up a secret algorithm for each of entities on the basis of a public identifier for each entity. After the completion of preparation for the distribution of the secret algorithm, a cipher key to be shared is found from a calculation as a function of the other party's public identifier and his own secret algorithm. For instance, as shown in FIG. 9, the center establishes secrete algorithms [Xa] and [Xb] on the basis of the public information A and B such as telephone numbers of clients A and B, while each of the clients A and B obtains his own algorithm from the center to calculate the cipher key kab common to the clients A and B in accordance with the obtained algorithm, that is, B·[Xa]→kab or A·[Xb]→kab.

In this method, because of the distribution of the secret algorithm to each entity, a further privacy or secrecy control mechanism becomes necessary. In addition, all the entities also can not share a common key. Moreover, in the case of changing the public identifier for the security purposes, the change of his own secret algorithm is also necessary. However, difficulty is encountered to re-change the secret algorithm when taking its practical use into consideration.

SUMMARY OF THE INVENTION

It is therefore an object of the present invention to provide a communication system based on a shared cipher key, a server unit for the same system, client unit for the same system and cipher key sharing method for communication systems, which are capable of proper cipher communications with many and unspecific parties and of making all the entities share a common key without much trouble in management or control irrespective of a large number of expected communication parties, and which are capable of facilitating the management because of not requiring the change of his own secret information even if the public information is altered for the security purposes nor needing the delivery of the secret algorithm to each entity for the prior preparation but keeping the secrecy during the delivery without the need for a further secrecy control mechanism, and further which do not need the actually difficult processes such as to alter the public identifier for the change of his own secret algorithm.

For this purpose, in accordance with the present invention, a cipher key shared is changeable only with the change of a server control variable without the change of the client side code figure (or password), although the prior center-managed cipher key sharing method requires the client side code figure in the case of the change of the shared cipher key. For this reason, a system operation to alter the shared cipher key becomes possible at short-time intervals, thus significantly improving the security of the cipher system. In addition, the conventional center-managed cipher key sharing method does not permit all the clients belonging to the same group share the same cipher key. On the contrary, according to this invention, a client group belonging to a server can share the same cipher key in such a manner that the server control variable is set to a specific value. Accordingly, the decryption within the group is possible only by the server control when particular situations such as an urgent situation take place.

More specifically, according to this invention, in a communication system based on a shared cipher key and composed of at least clients A and B and a server S1, the client A is equipped with storage means for retaining its own code figure a predetermined, an inherent or proper id producing algorithm [I] and a cipher key producing algorithm [K], means for producing an inherent id I(a) through the use of the code figure a and the inherent id producing algorithm [I], means for informing the server S1 of the produced inherent id I(a), means for requesting or demanding a public id of the client B from the server S1 in order to produce a common key with the client B, and means responsive to a public id S(I(b), v1) of the client B transmitted from the server S1 and the code figure a for producing a cipher key K(S(I(b), v1), a) using the cipher key producing algorithm [K], the client B is provided with storage means for storing its own code figure b predetermined, an inherent id producing algorithm [I] and the cipher key producing algorithm [K], means for producing an inherent id I(b) using the code figure b and the inherent id producing algorithm [I], means for informing the server S1 of the produced inherent id I(b), and means for obtaining a public id of the client A by way of one of the server S1 and a network couped to the client A and the client B and receiving a public id S(I(a), v1) of the client A and the code figure b to produce a cipher key K(S (I(a), v1), b) using the cipher key producing algorithm [K], and the server S1 is equipped with means for producing a control variable v1, storage means for storing the inherent id I(a) delivered from the client A, the inherent id I(b) delivered from the client B, the control variable v1 managed secretly and a public id producing algorithm [S], means for producing a public id S(I(b), v1) through the use of the inherent id I(b) of the client B, the control variable v1 and the public id producing algorithm [S] in response to the request from the client A, means for transmitting the produced public id S(I(b), v1) of the client B to the client A, means for producing the public id S(I(a), v1) of the client A using the inherent id I(a) of the client A, the control variable v1 and the public id producing algorithm [S], and means for transmitting the produced public id S(I(a), v1) to the client A, wherein the algorithms [I], [S] and [K] satisfy K(S (I(b), v1), a) =K(S (I(a), v1), b).

In addition, in accordance with this invention, there is provided a server unit for the shared cipher key based communication system comprising means for producing a control variable v1, storage means for storing an inherent id I(a) delivered from a client A and an inherent id I(b) delivered from a client B and further holding the control variable v1 being under secret management and a public id producing algorithm [S], means for producing a public id S(I(b), v1) of the client B using the inherent id I(b) of the client B, the control variable v1 and the public id producing algorithm [S] in response to a request from the client A, means for transmitting the produced public id S(I(b), v1) of the client B to the client A, means for producing a public id S(I(a), v1) of the client A using the inherent id I(a) of the client A, the control variable v1 and the public id producing algorithm [S], and means for transmitting the produced public id S(I(a), v1) to the client A.

Furthermore, in accordance with this invention, there is provided a client unit for the shared cipher key based communication system comprising storage means for storing a its own code figure a predetermined, an inherent id producing algorithm [I] and a cipher key producing algorithm [K], means for producing an inherent id I(a) using the code figure a and the inherent id producing algorithm [I], means for informing a server S1 of the produced inherent id I(a), means for requesting a public id of a client B from the server S1 to produce a common key to the client B, and means for receiving the client B public id S(I(b), v1) transmitted from the server S1 and the code figure a to produce a cipher key K(S(I(b), v1), a) using the cipher key producing algorithm [K].

Still further, in accordance with this invention, in a cipher key sharing method for a communication system composed of at least clients A and B and a server S1, the client A previously determines its own code figure a to produce an inherent id I(a) using an inherent id producing algorithm [I] and informs the server S1 of the produced inherent id I(a), and similarly the client B previously determines its own code figure to produce an inherent id I(b) using the inherent id producing algorithm [I] and informs the server S1 of the inherent id I(b). In addition, the client A requests a public id of the client B from the server S1 to produce a common key to the client B, while the server S1 produces a public id S(I(b), v1) of the client B using a public id producing algorithm [S] on the basis of the inherent id I(b) of the client B retained in the server S1 and a control variable v1 secretly managed by the server S1 in response to a request from the client A and transmits the produced public id S(I(b), v1) of the client B to the client A. Simultaneously, the server S1 produces a public id S(I(a), v1) of the client A on the basis of the inherent id I(a) of the client A and the control variable v1 the server S1 holds, and transmits the public id S(I(a), v1) of the client A to the client A. In response to this transmission, the client A produces a cipher key K(S (I(b), v1), a) using a cipher key producing algorithm [K] on the basis of its own code figure a and the obtained public id S(I(b), v1) of the client B, whereas the client B produces a cipher key K(S (I(a), v1), b) on the basis of the public id of the client A that the client B obtains through one of the server S1 and a network connected to the client A and the client B. In this case, the algorithms [I], [S] and [K] satisfies the condition of the cipher key K(S (I(b), v1), a)=the cipher key K(S(I(a), v1), b).

Moreover, in accordance with this invention, in a communication system based on a shared cipher key and composed of at least a client A controlled by a server S1, a client C controlled by a server S2 and a parent server S3 for controlling the servers S1 and S2, the client A is equipped with storage means for storing its own code figure a predetermined, an inherent id producing algorithm [I] and a cipher key producing algorithm [K], means for producing an inherent id I(a) through the use of the code figure a and the inherent id producing algorithm [I], means for informing the server S1 of the produced inherent id I(a), means for requesting a public id of the client C from the server S1 in order to produce a common key to the client C, and means for receiving a tertiary public id S(S(S(I(c), v2), v3), v1) of the client C transmitted from the server S1 and the code figure a to produce a cipher key K(S(S(S(I(c), v2), v3), v1), a) using the cipher key producing algorithm [K], the client C is provided with storage means for storing its own code figure c predetermined, an inherent id producing algorithm [I] and the cipher key producing algorithm [K], means for producing an inherent id I(c) using the code figure c and the inherent id producing algorithm [I], means for informing the server S2 of the produced inherent id I(c), and means for obtaining a tertiary public id S(S(S(I(a), v1), v3, v2) of the client A by way of a network couped to the client A and the client C to produce a cipher key K(S(S(S(I(a), v1), v3), v2), c) using the cipher key producing algorithm [K] on the basis of the tertiary public id S(S(S(I(a), v1), v3, v2) of the client A and the code figure c, and the server S1 is equipped with storage means for storing the inherent id I(a) delivered from the client A, a control variable v1 managed secretly and a public id producing algorithm [S], means for, when a request is made from the client A, checking whether or not the requesting party belongs to its own group, means for transferring the request from the client A to the parent server S3 when it does not belong to its own group, means for producing the tertiary public id S(S(S(I(c), v2), v3, v1) on the basis of a secondary public id S(S(I(c), v2), v3) of the client C from the parent server S3, the control variable v1 and the public id producing algorithm [S] to transmit the produced tertiary public id S(S(S(I(c), v2), v3, v1) to the client A, the server S2 is provided with storage means for storing the inherent id I(c) delivered from the client C and further for storing a control variable v2 secretly managed and the public id producing algorithm [S], means for, when a request is made from the parent server S3, producing a primary public id S(I(c), v2) of the client C using the inherent id I(c) of the client C, the control variable v2 and the public id producing algorithm [S], and means for transmitting the produced primary public id S(I(c), v2) of the client C to the parent server S3, and the parent server S3 is equipped with storage means for storing the primary public id S(I(c), v2) of the client C transmitted from the server S2 and further for storing a control variable v3 secretly managed and the public id producing algorithm [S], means for transferring a request from the server S1 to the server S2, means for, when receiving the primary public id S(I(c), v2) of the client C from the server S2, producing the secondary public id S(S(I(c), v2, v3) of the client C on the basis of the control variable v3 and the public id producing algorithm [S], and means for transmitting the produced secondary public id S(S(I(c), v2, v3) of the client C to the server S1, wherein the algorithms [I], [S] and [K] satisfies K(S(S(S (I(c), v2), v3), v1), a)=K(S(S(S(I(a), v1), v3) v2), c).

Furthermore, in accordance with this invention, there is provided a server unit for a communication system based on a shared cipher key, comprising storage means for storing an inherent id I(a) transmitted from a client A and further for storing a control variable v1 undergoing secret management and a public id producing algorithm [S], means for, when a request is made from the client A, checking whether or not a requesting party belongs to its own group, means for, when the requesting party does not belong to its own group, transferring the request from the client A to a parent server S3, and means for producing a tertiary public id S(S(S(I(c), v2), v3), v1) on the basis of a secondary public id S(S(I(c), v2, v3) of a client C from the parent server S3, the control variable v1and the public id producing algorithm [S] and for transmitting the produced tertiary public id S(S(S(I(c), v2), v3), v1) to the client A.

Still further, in accordance with this invention, there is provided a server unit for a communication system based on a cipher key, comprising storage means for storing a primary public id S(I(c), v2) of a client C transmitted from a server S2 and further for storing a control variable v3secretly managed and a public id producing algorithm [S], means for transferring a request from a server S1 to the server S2, means for, when receiving a primary public id S(I(c), v2) of a client C from the server S2, producing a secondary public id S(S(I(c), v2, v3) of the client C using the control variable v3 and the public id producing algorithm [S], and means for transmitting the produced secondary public id S(S(I(c), v2, v3) of the client C to the server S1.

Moreover, in accordance with this invention, there is provided a client unit for a communication system based on a shared cipher key, comprising storage means for storing its own code figure a predetermined, an inherent id producing algorithm [I] and a cipher key producing algorithm [K], means for producing an inherent id I(a) on the basis of the code figure a and the inherent id producing algorithm [I], means for informing a server S1 of the produced inherent id I(a), means for requesting a public id of a client C from the server S1 to produce a common key with the client C, and means for receiving a tertiary public id S(S(S(I(c), v2, v3), v1) of the client C transmitted from the server S1 and the code figure a to produce a cipher key K(S(S(S(I(c), v2), v3), v1), a) using the cipher key producing algorithm [K].

Furthermore, in accordance with this invention, a cipher key sharing method for a communication system composed of at least a client A being under control of a server S1, a client C being under control of a server S2 and a parent server S3 for controlling the servers S1 and S2, the client A previously determines its own code figure a to produce an inherent id I(a) using an inherent id producing algorithm [I] and informs the server S1 of the produced inherent id I(a), whereas the client C previously determines its own code figure c to produce an inherent id I(c) using an inherent id producing algorithm [I] and informs the server S2 of the produced inherent id I(a). In addition, the client A requests a public id of the client C from the server S1 to produce a common key to the client C, and the server S1 checks whether or not the client C being the requested communication party belongs to its own group and requests the public id of the client C from the parent server S3 when the client C does not belong to its own group. Thus, the parent server S3 requests the public id of the client C from the server S2 controlling the client C that the server S1 requests, and the server S2 produces a primary public id S(I(c), v2) of the client C using the algorithm [S] on the basis of the inherent id I(c) of the client C the server S2 retains and its own control variable v2 and transmits the produced primary public id to the parent server S3. In response to this transmission, the parent server S3 produces a secondary public id S(S(I(c), v2, v3) using the algorithm [S] on the basis of the primary public id S(I(c), v2) and its own control variable v3and transmits the produced secondary public id S(S(I(c), v2), v3) to the server S1, while the server S1 produces a tertiary public id S(S(S(I(c), v2), v3), v1) using the secondary public id S(S(I(c), v2), v3), the control variable v1 and the algorithm [S] and transmits the produced tertiary public id S(S(S(I(c), v2), v3), v1) to the client A. The client A produces a cipher key K(S(S(S(I(c), v2), v3), v1), a) using the tertiary public id S(S(S(I(c), v2), v3), v1), the code figure a the the algorithm [K], while the client C produces a cipher key K(S(S(S(I(a), v1), v3), v2), c) using the code figure c and the algorithm [K]. In this case, the algorithms [I], [S] and [K] satisfy K(S(S(S(I(c), v2), v3), v 1), a)=K(S(S(S(I(a), v1), v3), v2), c).

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
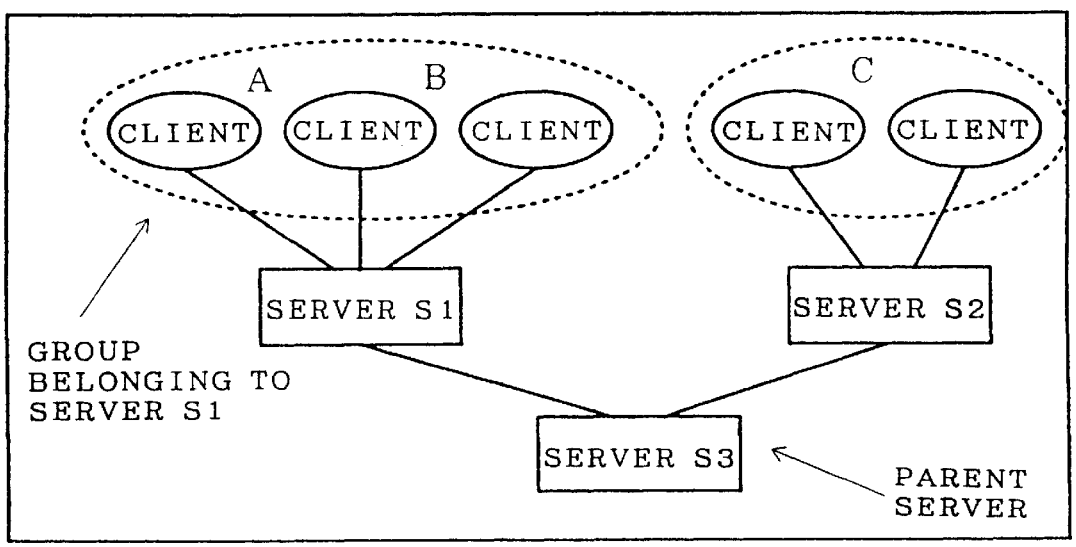
FIG. 1 is a block diagram typically showing an example of a communication network to which a cipher key based communication system according to the present invention is applicable.

A description will be made hereinbelow of a shared cipher key based communication system, a server unit for the same system, a client unit for the same system, and a cipher key sharing method in communication systems according to embodiments of the present invention. FIG. 1 is a block diagram showing one example of a communication system made through a shared cipher key. A cryptology communication network to which this invention applies is composed of two or more clients and one or more servers, each of the clients belonging to any server. Further, in the case of the presence of a plurality of servers exemplified in FIG. 1, these constitute a network in a logical hierarchical structure, and a lower rank server falls under any higher rank server. A higher rank server covering a lower rank server is referred to as a parent server, while a set of lower rank servers and clients falling under the same parent server is called a group. A hardware with a software in the clients is referred to as a client unit, whereas a software-included hardware in the servers is called a server unit. In this invention, limitation is not imposed on the number of servers but this invention is generally applicable to a system having a plurality of servers dispersed and disposed in a network for managing public identifications or identifiers (id).

The client is an entity which produces a shared cipher key by the help of the server to carry out a cryptology communication on the basis of the produced shared cipher key, and comes under all communication and information processing equipment including computers, IC cards and mobile communication equipment. Further, the server is an entity which provides services to the client to produce a shared cipher key, and falls under all communication and information processing equipment such as computers and mobile communication control units. In this instance, each of the client and the server is provided with a CPU (central processing unit), a memory, an interface, and so on to exert communication functions and data holding functions. In addition, communication lines making up a network cover not only wire systems such as public lines and high-speed digital lines but also wireless communications using electromagnetic waves or light and even combinations of wire and wireless systems.

Figure 2:
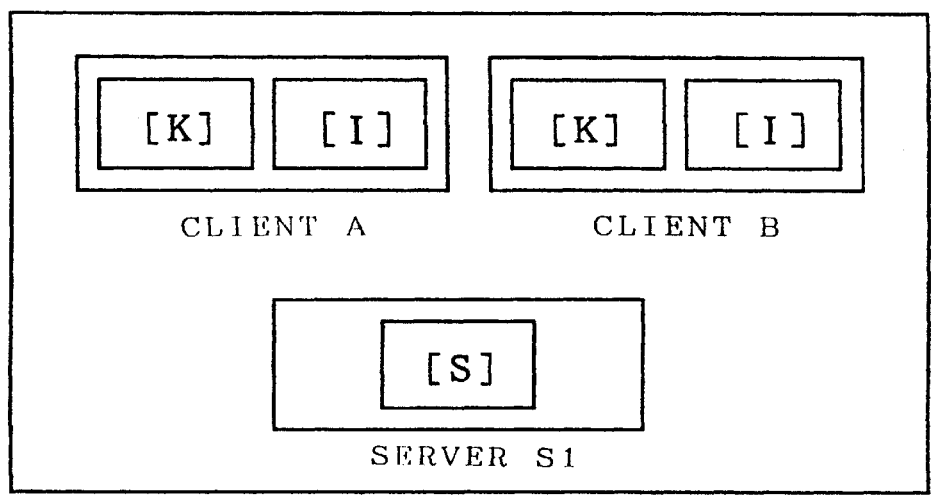
FIG. 2 is a typical illustration of a server S1 of FIG. 1 and algorithms of two clients A, B of a plurality of clients controlled by the server S1, corresponding to a first embodiment of the present invention.

All the clients retain an openable cipher key producing algorithm [K] and an inherent id producing algorithm [I] in common. The inherent id (identifier or identification) signifies a value produced through the algorithm [I] on the basis of a code figure or a password that each client retains in secret, with the inherent id being produced by the corresponding client and subsequently delivered to the server to come under control of the server. The code figure is not necessarily composed of only numerals but can also include a character(s). Incidentally, difficulty is encountered in the reverse conversion from the inherent id to the code FIG. because of the irreversibility of the algorithm [I]. all the servers retains an openable public id producing algorithm [S] in common. The public id means an openable value produced through the algorithm [S] on the basis of the inherent id of the client and a control variable of the server. FIG. 2 typically shows a server S1 of FIG. 1 and algorithms belonging to two clients A and B of a plurality of clients managed by the server S1.

Figure 3:
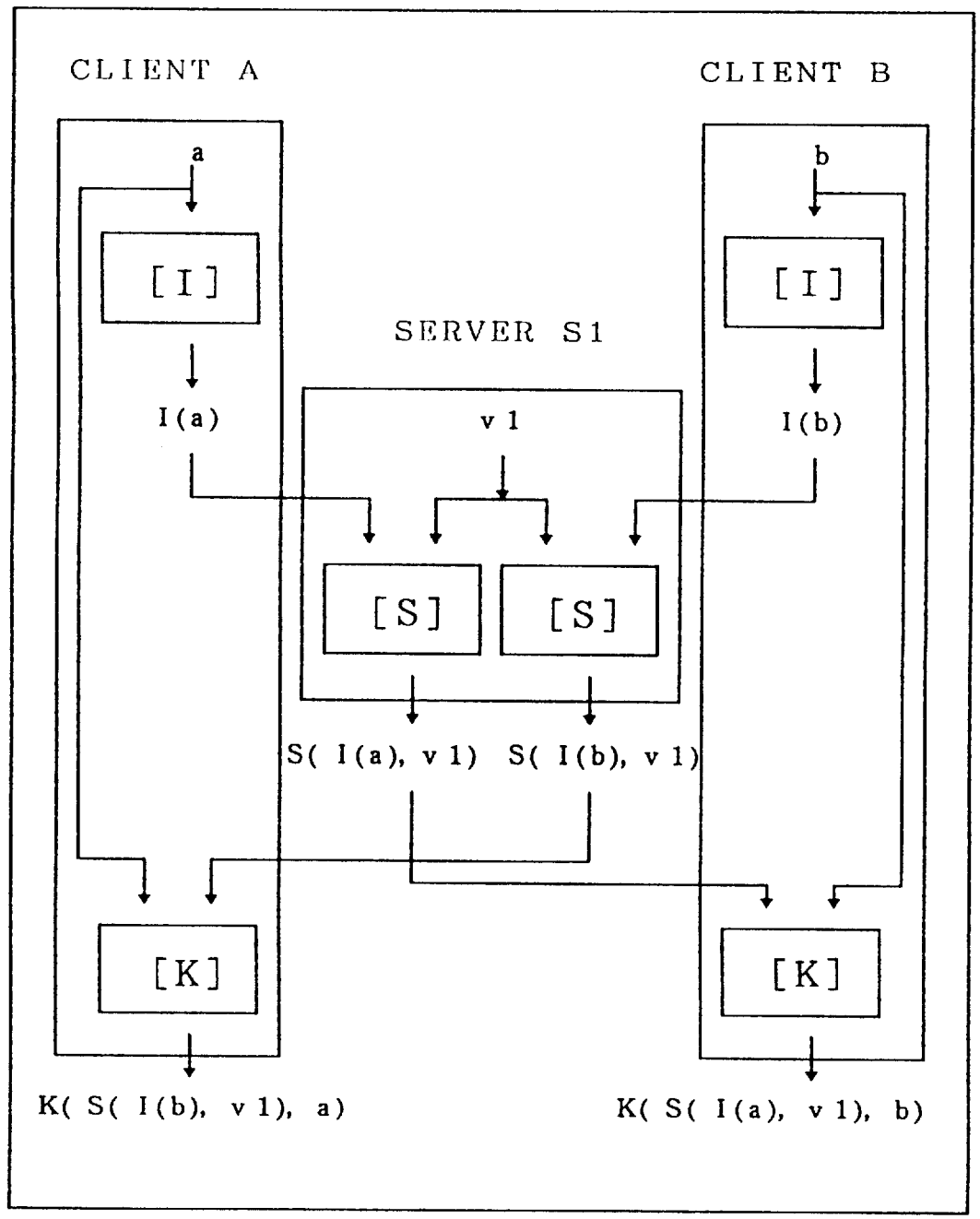
FIG. 3 is a typical illustration useful for describing an operation of the first embodiment of this invention.
Figure 4:
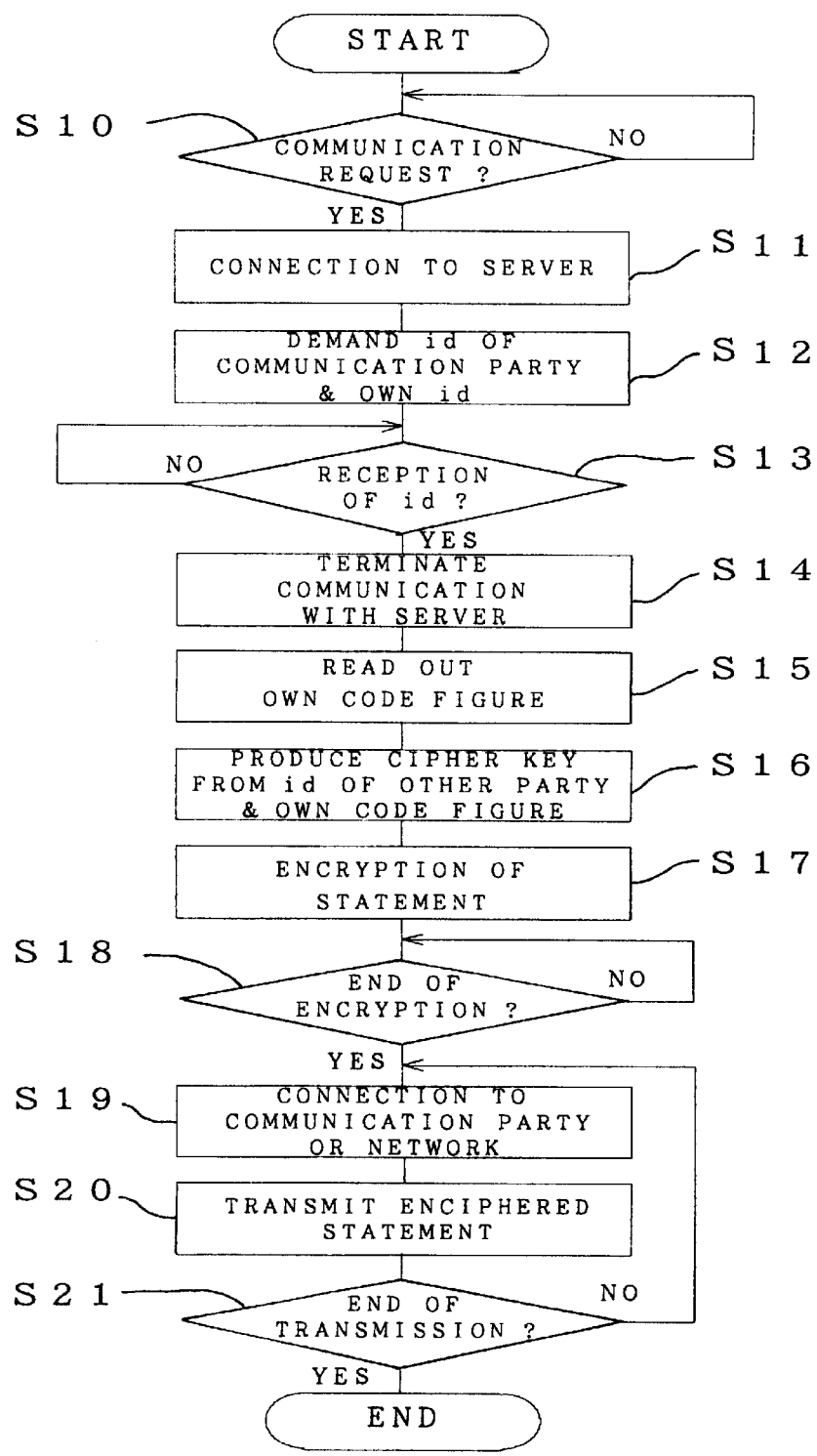
FIG. 4 is a flow chart typically showing an operation of a client of a server in the first embodiment of this invention.
Figure 5:
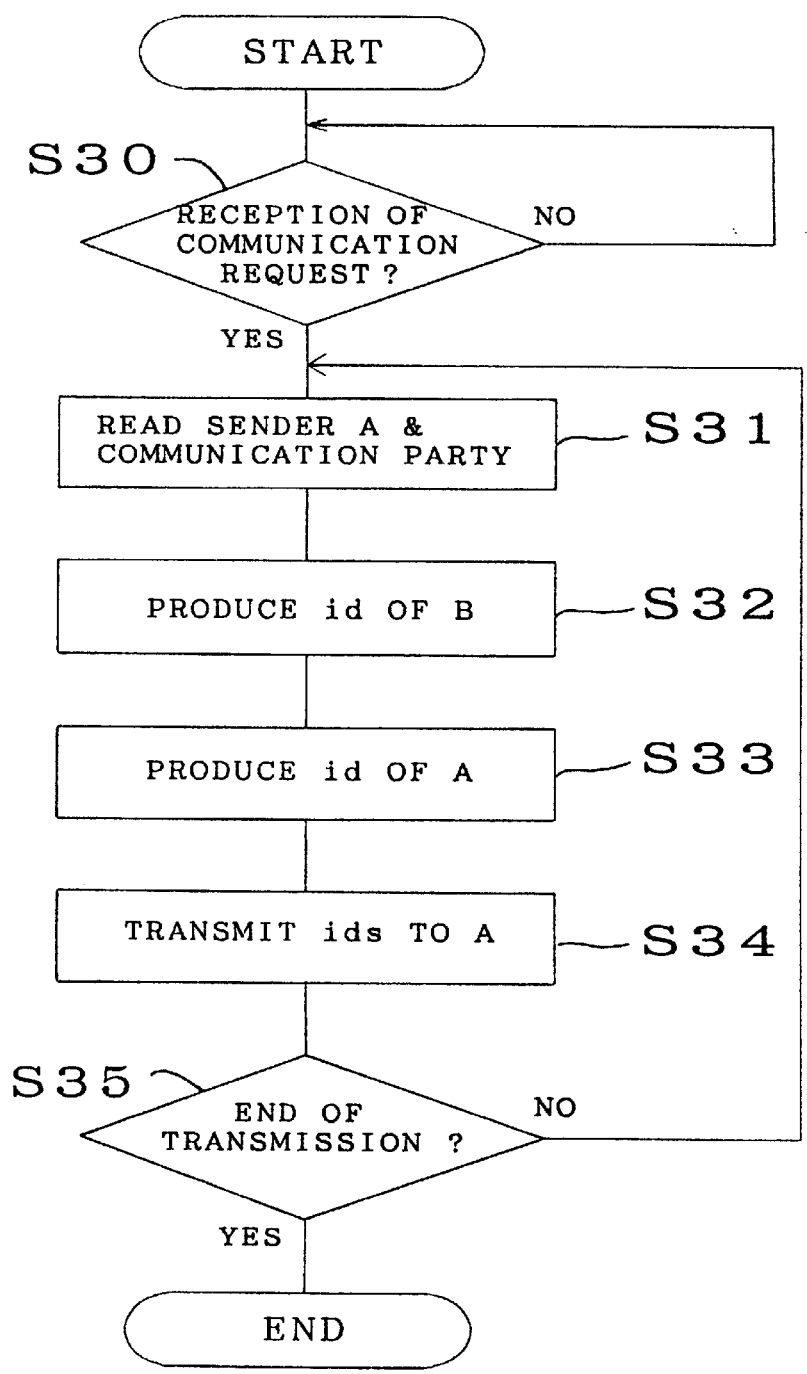
FIG. 5 is a flow chart typically showing an operation of a CPU of a server in the first embodiment of this invention.

Secondly, as a first embodiment of this invention a cipher key producing procedure will be made hereinbelow in the case of the FIG. 2 example, that is, in the case that the clients A and B belonging to the same server S1 produce a key. FIG. 3 typically illustrates the first embodiment, FIG. 4 is a flow chart available for explaining an operation of a CPU of the client A in the FIG. 3 embodiment, and FIG. 5 is a flow chart useful for describing an operation of a CPU of the server S1 in the FIG. 3 embodiment.

First of all, a description will be made hereinbelow of a procedure of producing a cipher key. That is, (1) The client A determines its own code figure a beforehand and produces an inherent id $I(a)$ through the use of the inherent id producing algorithm [I]. The client A informs the server S1 of the produced inherent id $I(a)$. As well as the client A, the client B produces its inherent id $I(b)$ and notices the same server S1 of it; (2) The client A requests a public id of the client B from the server S1 in order to produce a common key with the client B; (3) In response to a request from the client A, the server S1 produces a public id $S(I(b), v1)$ for the client B using the public id producing algorithm [S] on the basis of the inherent id $I(b)$ of the client B the server S1 retains and a control variable $v1$ the server S1 secretly manages and subsequently notices the client A of it; (4) Simultaneously, the server S1 produces a public id $S(I(a), v1)$ of the client A on the basis of the inherent id $I(a)$ of the client A, the server S1 retains, and the control variable $v1$ and informs the client A of the produced public id $S(I(a), v1)$ of the client A; (5) The client A produces a cipher key $K(S(I(b), v1), a)$ using the cipher key producing algorithm [K] on the basis of the public id $S(I(b), v1)$ of the client B the client A gets and its own secret code figure a; and (6) The client B obtains a public id of the client A through the server S1 or a network coupled to the client A and the client B to produce a cipher key $K(S(I(a), v1), b)$.

Secondly, a description will be made hereinbelow of a method of making both the clients A and B share the cipher key produced in the above-described way. In order for the client A and the client B to share the cipher key, the algorithms [I], [S] and [K] are determined to satisfy an equation (1): $K(S(I(b), v1), a) = (S(I(a), v1), b)$.

More specifically, for example, when a prime factor is taken to be P and a primitive root in mod p is taken as g, and if

[I]: $I(x) = g^x \bmod p$
[S]: $S(x1, x2) = x1^{x2} \bmod p$
[K]: $K(x1, x2) = x1^{x2} \bmod p$, then $$\begin{aligned}
K(S(I(b), v1), a) &= K(S(g^b \bmod p, v1), a) \\
&= K((g^b \bmod p)^{v1} \bmod p, a) \\
&= K((g^{b \cdot v1} \bmod p), a) \\
&= (g^{b \cdot v1} \bmod p)^a \bmod p) \\
&= g^{b \cdot v1 \cdot a} \bmod p
\end{aligned}$$

Similarly,
$K(S(I(a), v1), b) = g^{a \cdot v1 \cdot b} \bmod p$
Since $g^{b \cdot v1 \cdot a} \equiv g^{a \cdot v1 \cdot b}$ (mod p), the above-mentioned equation is satisfied, so that the client A and the client B can share the cipher key.

Furthermore, a description will be taken hereinbelow of a method of releasing a cipher key necessary for deciphering and converting into a plain text the data enciphered through the cipher key produced by the above-described way. As one example, the description will be made of a method of setting to a specific value a common key produced by the clients A and B belonging to the server S1 under control of the server S1. Setting the common key to the specific value substantially signifies the decryption, and this invention features that it is achievable only with the server side control without requiring a specific procedure in the client side. As described before, the client A produces $K(S(I(b), v1), a)$ as the common key, where a and b are values only the clients know, and the server can freely control only the control variable $v1$.

Accordingly, if employing the algorithms [K] and [S] that can create a specific value in relation to the control variable v1 regardless of the values a and b, setting the common key to a specific value is possible. For instance, with the aforesaid algorithms:

[S]: S (x1, x2)=x1$^{x2}$ mod p

[K]: K (x1, x2)=x1$^{x2}$ mod p when selecting v1=ψ(p) (ψ(p) : Eulerian function) in K (S (I(b), v1), a)=g$^{b \cdot v1 \cdot a}$ mod p, from the Eulerian theorem, g$^{b \cdot v1 \cdot a}$≡g$^{b \cdot \Lambda}$ψ(p) a≡(g$^{b \cdot a}$)$^{\Lambda}$ψ(p)≡1(mod p) where Λψ(p) represents raising to ψ(p) power (and so forth), thus, 1 is obtainable as the specific value.

In a similar way, the client B produces a common key:

K (S (I(a), v1), b)=g$^{a \cdot v1 \cdot b}$≡1 (mod p), accordingly, the common key is controllable to the specific value 1.

The operation of this first embodiment will be described hereinbelow with reference to the FIG. 4 flow chart showing an operation of a CPU used in a client unit for the client A and the FIG. 5 flow chart showing an operation of a CPU used in a server unit for the server S1. In FIG. 4, after a given initialization (omitted in the illustration), the operation starts with a step S10 to detect the presence or absence of a communication request. If the request takes place, a step S11 carries out the connection to the server S1. Now, assuming the communication from the client A to the client B, a step S12 requests the public id for the client B being the communication party and its (client A) public id from the server S1. In this case, the server S1 takes the request from the client A through steps S30 and S31 in FIG. 5 and produces the public ids for the clients B and A in steps S32 and S33 and delivers them to the client A in a step S34. A step S35 is for the purpose of check whether or not the transmission to the client A normally comes to completion. Otherwise, the operation restarts from the step S31.

Returning back to FIG. 4, a step S13 checks the reception of the two public ids from the server S1. If the answer of the step S13 is affirmative, the communication with the server S1 ends in a step S14. A step S15 follows to read out its own code figure a and subsequently a step S16 comes into operation to produce a cipher key by using the algorithm [K]. Further, in a step S17, a communication statement, i.e., a telegraphic message, to be transmitted to the client B is enciphered according to the cipher key and a given encryption algorithm. After the encryption, the connection to the communication party or the network is made to transmit the enciphered sentence in steps S18, S19 and S20. In case that the transmission does not normally come to an end, the steps S19 and S20 are again executed by way of a step S21. Incidentally, in the case of the connection to the network, the enciphered sentence is not directly delivered to the client B but is retained in a memory of a given server, and thereafter the client B makes access to that server to take it out.

Figure 6:
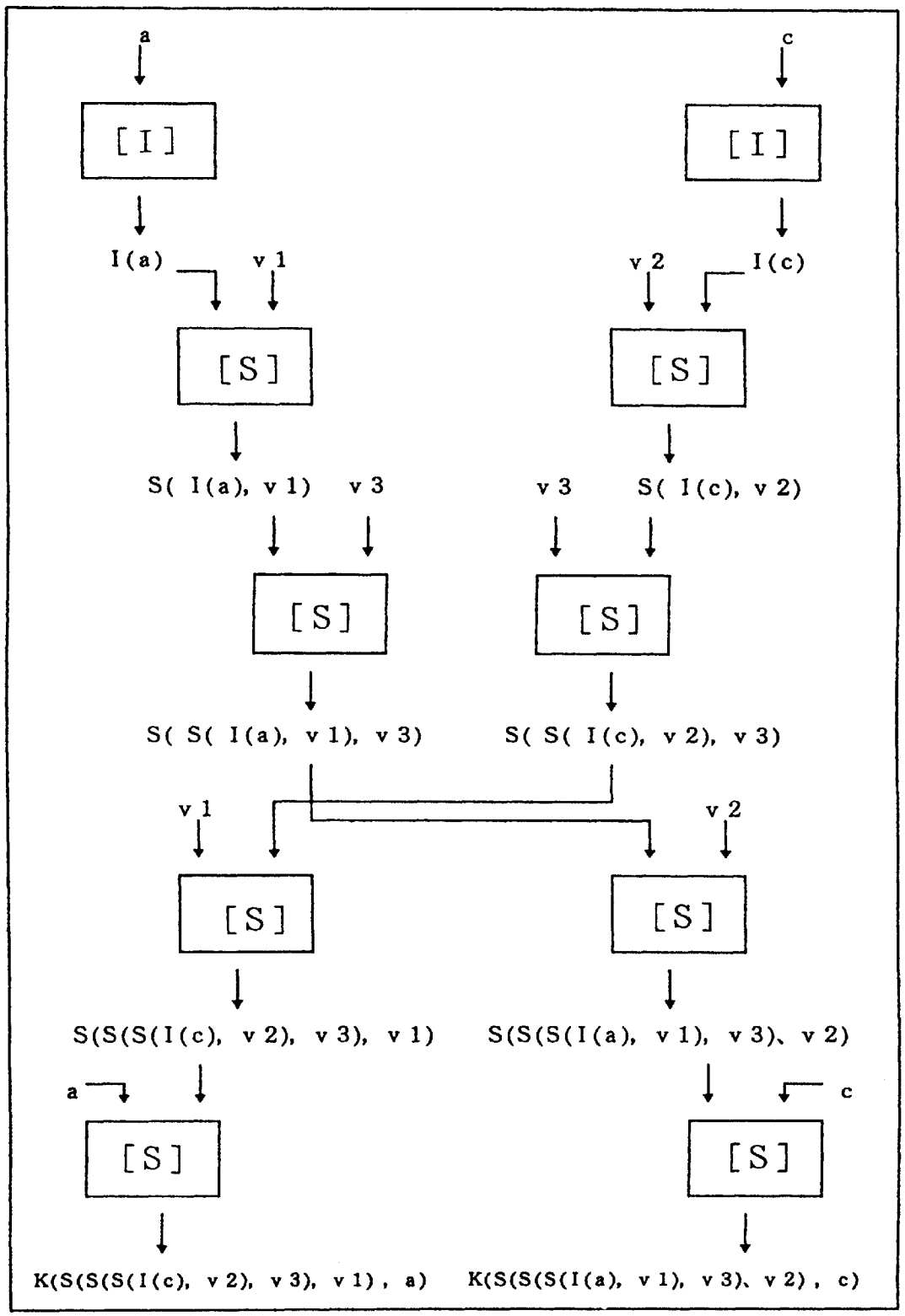
FIG. 6 is a typical illustration of an operation of a second embodiment of the present invention.
Figure 7:
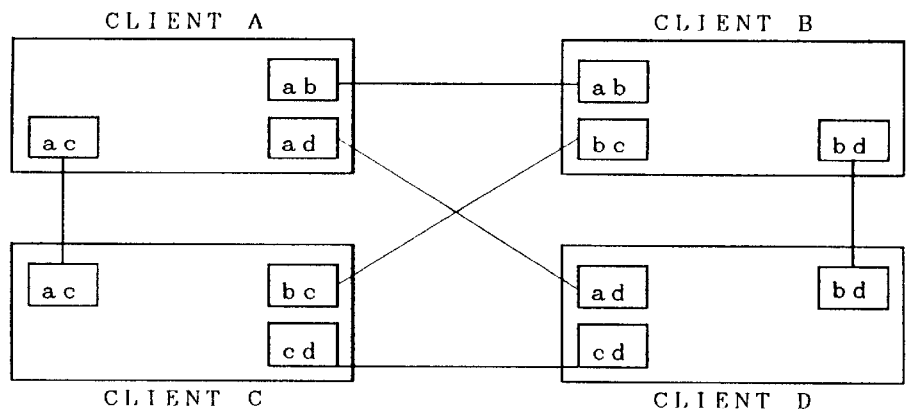
FIG. 7 is a typical illustration of one example of the prior cipher key sharing methods.
Figure 8:
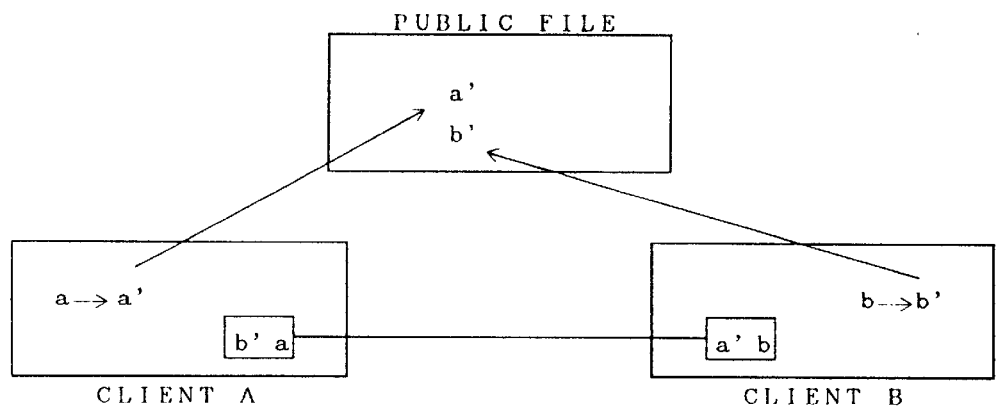
FIG. 8 is a typical illustration of one example of the prior cipher key sharing methods.
Figure 9:
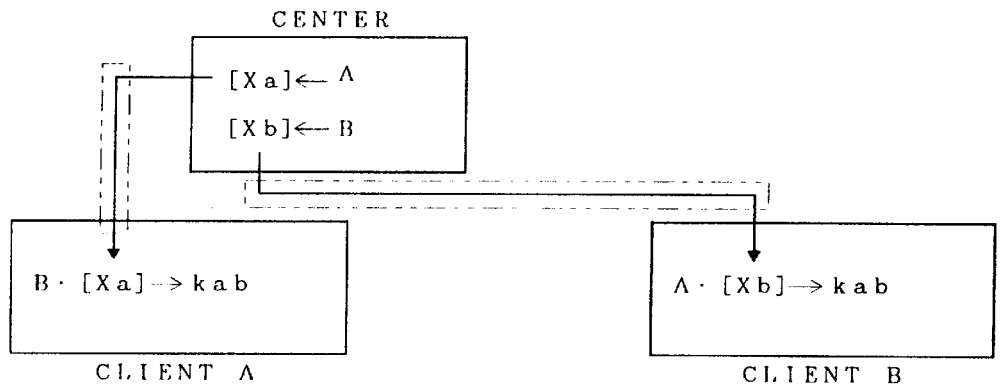
FIG. 9 is a typical illustration of one example of the prior cipher key sharing methods.

Secondly, a description will be made hereinbelow of a second embodiment of the present invention, that is, a method of sharing a key with a different group. More specifically, for the description this second embodiment relates to sharing a key between a client A belonging to a server S1 and a client C belonging to a server S2. In this instance, the parent server of the servers S1 and S2 is taken to be S3 as shown in FIG. 6. In addition, the inherent id I(a) of the client A and the inherent id I(c) of the client C are delivered to the server S1 and the server S2, respectively. The operation of the second embodiment is as follows. That is, (1) The client A demands the public id of the client C from the server S1;

(2) The server S1 demands the public id of the client C from the parent server S3 because the client C does not fall under its own group;

(3) The parent server S3 requests the public id of the client C from the server S2 managing the client C, where knowing the server (S2) managing the client C can readily be realized in such a way that the client is named with a logical hierarchical structure such as C-S2-S3;

(4) The server S2 produces S(I(c), v2) using the algorithm [S] on the basis of the inherent id I(c) of the client C it retains and its own control variable v2 and informs the parent server S3 of the produced S (I(c), v2);

(5) The parent server S3 produces S(S(I(c), v2), v3) using the algorithm [S] on the basis of S(I(c), v2) and its own control variable v3 and gives the result to the server S1;

(6) Similarly, the server S1 produces S(S(S(I(c), v2), v3), v1) and notices the client A of the result;

(7) The client A produces a cipher key K(S(S(S(I(c), v2), v3), v1), a); and (8) Similarly, the client C produces a cipher key K(S(S (S(I(a), v1), v3), v2), c).

In the case of the aforementioned algorithms of:

[I]: I(x)=g$^x$ mod p

[S]: S (x1, x2)=x1$^{x2}$ mod p

[K]: K (x1, x2)=x1$^{x2}$ mod p, then $$\begin{aligned} K(S(S(S(I(c), v2), v3), v1), a) &= K(S(S(S(g^c \bmod p), v2), v3), v1), a) \\ &= K(S(S(g^{c \cdot v2} \bmod p), v3), v1), a) \\ &= K(S(g^{c \cdot v2 \cdot v3} \bmod p), v1), a) \\ &= K(g^{c \cdot v2 \cdot v3 \cdot v1} \bmod p), a) \\ &= g^{c \cdot v2 \cdot v3 \cdot v1 \cdot a} \bmod p \end{aligned}$$

In a similar way,

K (S (S (S (I(a), v2), v3), v1), c)=g$^{a \cdot v1 \cdot v3 \cdot v2 \cdot c}$ mod p, and g$^{c \cdot v2 \cdot v3 \cdot v1 \cdot a}$≡g$^{a \cdot v1 \cdot v3 \cdot v2 \cdot c}$ (mod p)

This means that sharing a cipher key is possible with respect to a client belonging to a different group.

Although the above-described embodiments are concerned with the communication between two clients, even if the number of clients increases, sharing a cipher is practicable on a similar principle. In addition, even if the network gets into a more complicated condition as compared with the FIG. 1 network, for example, if servers are arranged to assume a hierarchical structure exceeding two stages, the cipher-sharing is also possible.

The communication system based on a shared cipher key, a server unit for the same system, a client unit for the same system and a cipher key sharing method in communication systems according to the present invention are arranged as described above and exhibit the following effects. That is, although for the change of the shared cipher key the prior center managing cipher key sharing method requires the change of the client side code figure, the method according to this invention can change the shared cipher key with only the change of the server control variable without the need for changing the client side code figure. Accordingly, the system operation to change the shared cipher key becomes possible at a short-time interval so that the security of the cipher system significantly improves. In addition, although the prior center managing cipher key sharing method can not make all the clients belonging to the same group share the same cipher key, the method according to this invention allows sharing the same cipher key within a client group belonging to a server in such a manner that the control variable of the server is set to a specific value. Thus, an in-group cipher is decipherable with only the server control in particular situations such as urgent situations.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A communication system established through the use of a shared cipher key and composed of at least clients A and B and a server S1, said client A comprising:

storage means for retaining its own code figure a predetermined, an inherent identifier producing algorithm [I] and a cipher key producing algorithm [K];

means for producing an inherent identifier I($a$) using said code figure a and said inherent identifier producing algorithm [I];

means for informing said server S1 of the produced inherent identifier I($a$);

means for demanding a public identifier of said client B from said server S1 to produce a key common to said client B; and means for producing a cipher key K(S(I($b$), v1), a) using said cipher key producing algorithm [K] on the basis of said public identifier S(I($b$), v1) of said client B transmitted from said server S1 and said code figure a, said client B comprising:

storage means for storing its own code figure b predetermined, an inherent identifier producing algorithm [I] and said cipher key producing algorithm [K];

means for producing an inherent identifier I($b$) using said code figure b and said inherent identifier producing algorithm [I];

means for informing said server S1 of the produced inherent identifier I($b$); and means for obtaining a public identifier of said client A through one of said server S1 and a network couped to said clients A and B and for producing a cipher key K(S(I($a$), v1), b) using said cipher key producing algorithm [K] on the basis of the public identifier S(I($a$), v1) of said client A and the code figure b, and the server S1 comprising:

means for producing a control variable v1;

storage means for storing said inherent identifier I($a$) delivered from said client A, said inherent identifier I($b$) delivered from said client B, said control variable v1 managed secretly and a public identifier producing algorithm [S];

means for producing a public identifier S(I($b$), v1) using said inherent identifier I($b$) of said client B, said control variable v1 and said public identifier producing algorithm [S] in response to a request from said client A;

means for transmitting the produced public identifier S(I($b$), v1) of said client B to said client A means for producing a public identifier S(I($a$), v1) of said client A using said inherent identifier I($a$) of said client A, said control variable v1 and said public identifier producing algorithm [S]; and means for transmitting the produced public identifier S(I($a$), v1) to said client A, wherein said algorithms [I], [S] and [K] are made to satisfy a condition that said cipher key K(S (I($b$), v1), a)=said cipher key K(S (I($a$), v1), b).

2. A server unit for use in a communication system established through the use of a shared cipher key and composed of at least clients A and B, comprising:

means for producing a control variable v1;

storage means for storing an inherent identifier I($a$) delivered from a client A and an inherent identifier I($b$) delivered from a client B and further holding said control variable v1 being under secret management and a public identifier producing algorithm [S];

means for producing a public identifier S(I($b$), v1) of said client B using said inherent identifier I($b$) of said client B, said control variable v1 and said public identifier producing algorithm [S] in response to a request from said client A;

means for transmitting the produced public identifier S(I($b$), v1) of said client B to said client A;

means for producing a public identifier S(I($a$), v1) of said client A using said inherent identifier I($a$) of said client A, said control variable v1 and said public identifier producing algorithm [S]; and means for transmitting the produced public identifier S(I($a$), v1) to said client A.

3. A client unit for use in a communication system established through the use of a shared cipher key and composed of a server S1 controlling clients, comprising:

storage means for storing a its own code figure a predetermined, an inherent identifier producing algorithm [I] and a cipher key producing algorithm [K];

means for producing an inherent identifier I($a$) using said code figure a and the inherent identifier producing algorithm [I];

means for informing said server S1 of the produced inherent identifier I($a$);

means for requesting a public identifier of another client being a communication party from said server S1 to produce a common key to said another client; and means for produce a cipher key K(S(I($b$), v1), a) using the cipher key producing algorithm [K] on the basis of the public identifier S(I($b$), v 1) of said another client transmitted from said server S1 and said code figure a.

4. A method of sharing a cipher key in a communication system composed of at least clients A and B and a server S1, comprising the steps of:

making said client A previously determine its own code figure a to produce an inherent identifier I($a$) using an inherent identifier producing algorithm [I];

informing said server S1 of the produced inherent identifier I($a$); making said client B previously determine its own code figure to produce an inherent identifier I($b$) using the inherent identifier producing algorithm [I];

informing said server S1 of the produced inherent identifier I($b$); requesting a public identifier of said client B from the server S1 so that said client A produces a common key to said client B;

making said server S1 produce a public identifier S(I($b$), v1) of said client B using a public identifier producing algorithm [S] on the basis of said inherent identifier I($b$) of said client B said server S1 retains and a control variable v1 said server S1 secretly manages in response to a request from said client A;

transmitting the produced public identifier S(I($b$), v1) of said client B to said client A;

making said server S1 produce a public identifier S(I($a$), v1) of said client A on the basis of said inherent identifier I(*a*) of said client A and said control variable v1 said server S1 retains;

transmitting the public identifier S(I(*a*), v1) of said client A to said client A;

making said client A produce a cipher key K(S (I(*b*), v1), a) using a cipher key producing algorithm [K] on the basis of said code figure a and the obtained public identifier S(I(*b*), v1) of said client B; and making said client B produce a cipher key K(S(I(*a*), v1 ), b) on the basis of the public identifier of said client A that said client B obtains through one of said server S1 and a network connected to said client A and said client B, wherein said algorithms [I], [S] and [K] satisfies the condition of said cipher key K(S(I(*b*), v1), a)=said cipher key K(S(I(*a*), v1), b).

5. A communication system made through the use of a shared cipher key and composed of at least a client A controlled by a server S1, a client C controlled by a server S2 and a parent server S3 for controlling said servers S1 and S2, said client A comprising:

storage means for storing its own code figure a predetermined, an inherent identifier producing algorithm [I] and a cipher key producing algorithm [K];

means for producing an inherent identifier I(*a*) using said code figure a and said inherent identifier producing algorithm [I];

means for informing said server S1 of the produced inherent identifier I(*a*);

means for requesting a public identifier of said client C from said server S1 to produce a common key to said client C; and means for producing a cipher key K(S(S(S(I(*c*), v2), v3), v1), a) using said cipher key producing algorithm [K] on the basis of a tertiary public identifier S(S(I(*c*), v2), v3), v1) of said client C transmitted from said server S1 and said code figure a, said client C comprising:

storage means for storing its own code figure c predetermined, an inherent identifier producing algorithm [I] and said cipher key producing algorithm [K];

means for producing an inherent identifier I(*c*) using said code figure c and said inherent identifier producing algorithm [I];

means for informing the server S2 of the produced inherent identifier I(*c*); and means for obtaining a tertiary public identifier S(S(S(I(*a*), v1), v3, v2) of said client A through a network coupled to said client A and said client C to produce a cipher key K(S(S(S(I(*a*), v1), v3), v2), c) using said cipher key producing algorithm [K] on the basis of said tertiary public identifier S(S(S(I(*a*), v1), v3, v2) of said client A and said code figure c, and said server S1 comprising:

storage means for storing said inherent identifier I(*a*) delivered from said client A, a control variable v1managed secretly and a public identifier producing algorithm [S];

means for, when a request is made from said client A, checking whether or not a requesting party belongs to its own group;

means for transferring the request from said client A to said parent server S3 when it does not belong to its own group; and means for producing said tertiary public identifier S(S(S(I(*c*), v2), v3, v1) on the basis of a secondary public identifier S(S(I(*c*), v2), v3) of said client C from said parent server S3, said control variable v1and said public identifier producing algorithm [S] and for transmitting the produced tertiary public identifier S(S(S(I (*c*), v2), v3, v1) to said client A, said server S2 comprising:

storage means for storing said inherent identifier I(*c*) delivered from said client C and further for storing a control variable v2 secretly managed and said public identifier producing algorithm [S];

means for, when a request is made from said parent server S3, producing a primary public identifier S(I(*c*), v2) of said client C using said inherent identifier I(*c*) of said client C, said control variable v2 and said public identifier producing algorithm [S]; and means for transmitting the produced primary public identifier S(I(*c*), v2) of said client C to said parent server S3, and said parent server S3 comprising:

storage means for storing said primary public identifier S(I(*c*), v2) of said client C transmitted from said server S2 and further for storing a control variable v3secretly managed and said public identifier producing algorithm [S];

means for transferring a request from said server S1 to said server S2;

means for, when receiving said primary public identifier S(I(*c*), v2) of said client C from said server S2, producing said secondary public identifier S(S(I(*c*), v2, v3) of said client C on the basis of said control variable v3and said public identifier producing algorithm [S]; and means for transmitting the produced secondary public identifier S(S(I(*c*), v2, v3) of said client C to said server S1, wherein the algorithms [I], [S] and [K] satisfies the condition of said cipher key K(S(S(S(I(*c*), v2), v3), v1), a)=said cipher key K(S(S(S(I(*a*), v1), v3) v2), c).

6. A server unit for a communication system made through the use of a shared cipher key and composed of at least a client A controlled by a server S1, a client C controlled by a server S2 and a parent server S3 for controlling said servers S1 and S2, comprising:

storage means for storing an inherent identifier I(*a*) transmitted from a client A and further for storing a control variable v1 undergoing secret management and a public identifier producing algorithm [S];

means for, when a request is made from said client A, checking whether or not a requesting party belongs to its own group;

means for, when the requesting party does not fall under its own group, transferring the request from said client A to said parent server S3; and means for producing a tertiary public identifier S(S(S(I(*c*), v2), v3), v1) on the basis of a secondary public identifier S(S(I(*c*), v2, v3) of said client C, based on a primary public identifier S(I(*c*), v2), from said parent server S3, said control variable v1and said public identifier producing algorithm [S] and for transmitting the produced tertiary public identifier S(S(S(I(*c*), v2), v3), v1) to said client A.

7. A server unit for a communication system made through the use of a shared cipher key and composed of at least a client A controlled by a server S1, a client C controlled by a server S2, said server unit controlling said servers S1 and S2, said server unit comprising:

storage means for storing a primary public identifier S(I(c), v2) of said client C transmitted from said server S2 and further for storing a control variable v3 secretly managed and a public identifier producing algorithm [S];

means for transferring a request from said server S1 to said server S2;

means for, when receiving a primary public identifier S(I(c), v2) of said client C from said server S2, producing a secondary public identifier S(S(I(c), v2, v3) of said client C using said control variable v3 and said public identifier producing algorithm [S]; and means for transmitting the produced secondary public identifier S(S(I(c), v2, v3) of said client C to said server S1.

8. A client unit for a communication system made through the use of a shared cipher key, said client unit being under control of a server S1, comprising:

storage means for storing its own code figure a predetermined, an inherent identifier producing algorithm [I] and a cipher key producing algorithm [K];

means for producing an inherent identifier I(a) on the basis of said code figure a and said inherent identifier producing algorithm [I];

means for informing said server S1 of the produced inherent identifier I(a);

means for requesting a public identifier of another client from said server S1 to produce a common key with the another client; and means for receiving a tertiary public identifier S(S(S(I(c), v2, v3), v1) of the another client transmitted from said server S1 and said code figure a to produce a cipher key K(S(S(I(c), v2), v3), v1), a) using said cipher key producing algorithm [K].

9. A method of sharing a cipher key in a communication system composed of at least a client A being under control of a server S1, a client C being under control of a server S2 and a parent server S3 for controlling said servers S1 and S2, comprising the steps of:

making said client A previously determine its own code figure a to produce an inherent identifier I(a) using an inherent identifier producing algorithm [I];

informing said server S1 of the produced inherent identifier I(a); making said client C previously determine its own code figure c to produce an inherent identifier I(c) using an inherent identifier producing algorithm [I];

informing said server S2 of the produced inherent identifier I(a);

making said client A request a public identifier of said client C from said server S1 to produce a common key to said client C;

checking whether or not said client C being the requested communication party belongs to its own group;

making said server S1 request said public identifier of said client C from said parent server S3 when said client C does not belong to its own group;

making said parent server S3 request said public identifier of said client C from the server S2 controlling said client C that said server S1 requests;

making said server S2 produce a primary public identifier S(I(c), v2) of said client C using the algorithm [S] on the basis of said inherent identifier I(c) of said client C said server S2 retains and its own control variable v2;

transmitting the produced primary public identifier from said server S2 to said parent server S3;

making said parent server S3 produce a secondary public identifier S(S (I(c), v2, v3) using said algorithm [S] on the basis of said primary public identifier S(I(c), v2) and its own control variable v3;

transmitting the produced secondary public identifier S(S (I(c), v2), v3) from said parent server S3 to said server S1;

making said server S1 produce a tertiary public identifier S(S(S(I(c), v2), v3), v1) using said secondary public identifier S(S(I(c), v2), v3), said control variable v1 and said algorithm [S];

transmitting the produced tertiary public identifier S(S(S (S(I(c), v2), v3), v1) from said server S1 to said client A;

making said client A produce a cipher key K(S(S(S(I(c), v2), v3), v1), a) using said tertiary public identifier S(S(S(I(c), v2), v3), v1), said code figure a and said algorithm [K]; and making said client C produce a cipher key K(S(S(S(I(a), v1), v3), v2), c) using said code figure c and said algorithm [K], wherein said algorithms [I], [S] and [K] satisfy the condition of said cipher key K(S(S(S(I(c), v2), v3), v1), a)=said cipher key K(S(S(S(I(a), v1), v3), v2), c).

* * * * *